United States Patent
Dibble et al.

(10) Patent No.: US 6,227,275 B1
(45) Date of Patent: May 8, 2001

(54) METHOD FOR PRODUCING FABRIC COVERED PANELS

(75) Inventors: Floyd H. Dibble, Danbury; Robert S. Soloff, Ridgefield, both of CT (US)

(73) Assignee: Sonics & Mateials, Inc., Newtown, CT (US)

( * ) Notice: Subject to any disclaimer, the term of this patent is extended or adjusted under 35 U.S.C. 154(b) by 0 days.

(21) Appl. No.: 09/498,847

(22) Filed: Feb. 7, 2000

Related U.S. Application Data

(63) Continuation of application No. 09/399,498, filed on Jun. 24, 1999, now Pat. No. 6,066,217.
(60) Provisional application No. 60/105,226, filed on Oct. 22, 1998.

(51) Int. Cl.[7] .................................................. B29C 65/06
(52) U.S. Cl. ........................................... 156/580; 156/73.5
(58) Field of Search ................................. 156/73.1, 73.5, 156/580, 580.1, 580.2; 264/68

(56) References Cited

U.S. PATENT DOCUMENTS

| | | |
|---|---|---|
| 3,492,367 * | 1/1970 | Starkweather, Jr. ............... 156/73.5 |
| 3,494,280 * | 2/1970 | Kobiella ..................... 156/73.5 X |
| 3,873,387 | 3/1975 | Schoening . |
| 3,941,641 | 3/1976 | Heller, Jr. et al. . |
| 3,956,975 | 5/1976 | Egleston et al. . |
| 3,996,403 | 12/1976 | Gould et al. . |
| 4,035,547 | 7/1977 | Heller, Jr. et al. . |
| 4,058,421 | 11/1977 | Summo . |
| 4,119,449 | 10/1978 | Gould et al. . |
| 4,144,110 | 3/1979 | Luc . |
| 4,146,416 | 3/1979 | Goldman . |
| 4,265,954 | 5/1981 | Romanek . |
| 4,324,827 | 4/1982 | Obayashi et al. . |
| 4,377,428 | 3/1983 | Toth . |
| 4,378,262 | 3/1983 | Annis, Jr. . |
| 4,427,471 | 1/1984 | Chierici . |
| 4,601,927 | 7/1986 | Durfee . |
| 4,621,760 | 11/1986 | King et al. . |
| 4,662,037 | 5/1987 | Provost et al. . |
| 4,668,316 | 5/1987 | Sager . |
| 4,776,905 * | 10/1988 | Cheung et al. ..................... 156/73.5 |
| 4,820,363 | 4/1989 | Fischer . |
| 4,952,271 * | 8/1990 | Cheung et al. ..................... 156/502 |
| 5,026,445 * | 6/1991 | Mainolfi et al. ................... 156/73.5 |
| 5,049,274 | 9/1991 | Leason et al. . |
| 5,076,870 | 12/1991 | Sanborn . |
| 5,421,925 | 6/1995 | Kulaszewicz et al. . |
| 5,468,335 * | 11/1995 | Mainolfi et al. ................. 156/580.2 |
| 5,487,802 * | 1/1996 | Mizuta et al. ..................... 156/73.1 |
| 5,538,581 | 7/1996 | Gallant . |
| 5,603,795 | 2/1997 | Paulauskas et al. . |
| 5,695,865 | 12/1997 | Shimizu . |
| 5,705,003 * | 1/1998 | Farrow et al. ..................... 156/73.5 |

FOREIGN PATENT DOCUMENTS 2140422  1/1995  (CA) .

* cited by examiner

*Primary Examiner*—James Sells
(74) *Attorney, Agent, or Firm*—St. Onge Steward Johnston & Reens LLC

(57) ABSTRACT

A method for vibration or orbital welding of a fabric to a thermoplastic substrate includes forming an assembly which has a decorative outer face without markings or pin dents that need to be removed or brushed out. The fabric can be woven or non-woven material and usually is characterized by high and low density regions that are bonded to a thermoplastic substrate in a vibration welder having a smooth surfaced platen applying pressure to the exposed surface of the fabric. High quality bonds or vibration welds are obtained between a fabric and a thermoplastic substrate characterized by a textured surface having tiny raised regions.

11 Claims, 8 Drawing Sheets

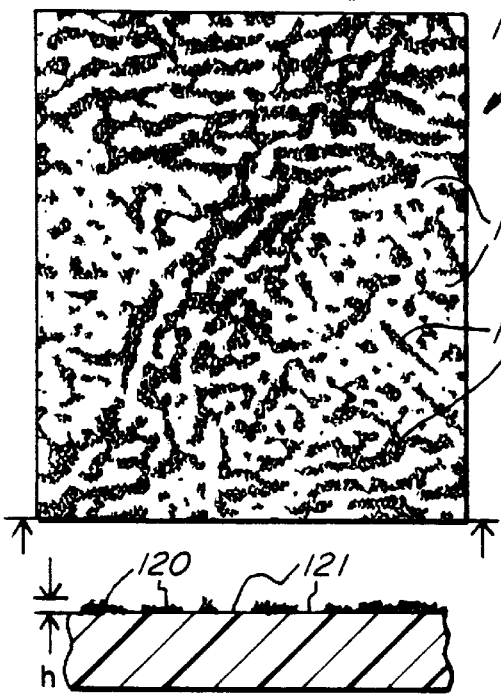
FIG. 16
FIG. 16A
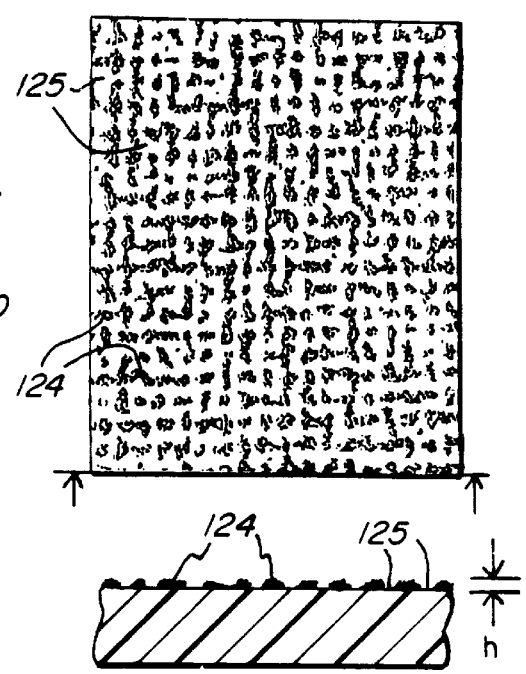
FIG. 18
FIG. 18A
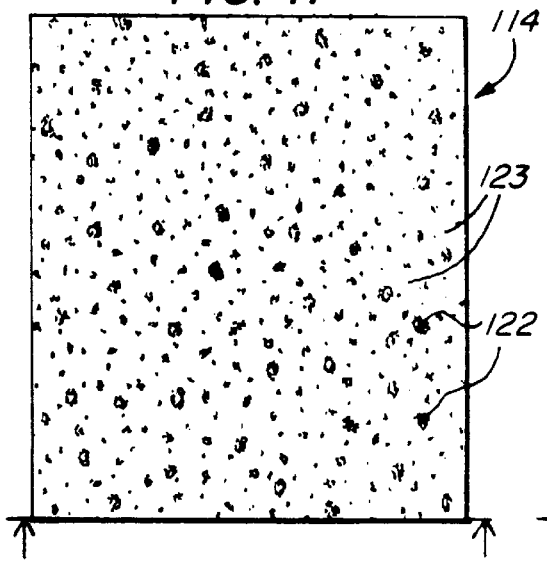
FIG. 17
FIG. 17A
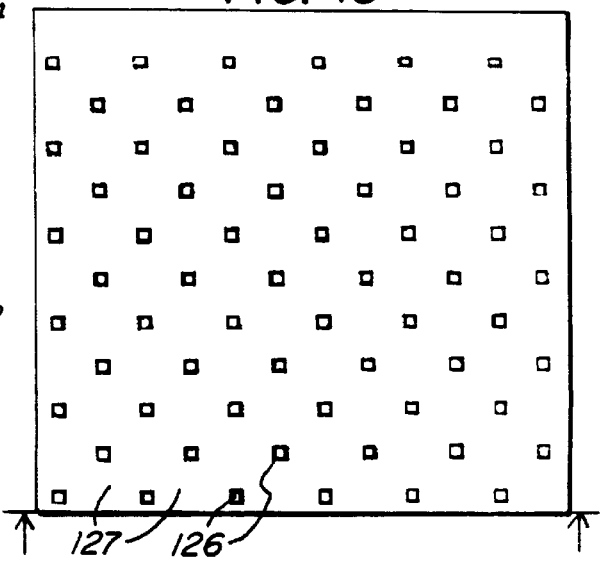
FIG. 19
FIG. 19A

METHOD FOR PRODUCING FABRIC COVERED PANELS

PRIOR APPLICATION

This application is a continuation of U.S. application Ser. No. 09/339,498 filed Jun. 24, 1999, U.S. Pat. No. 6,066,217 which is a continuation-in-part of Provisional Application of U.S. No. 60/105,226 filed on Oct. 22, 1998 and which is fully incorporated herein by reference thereto.

FIELD OF THE INVENTION

This invention relates to the field of manufacturing fabric covered panels. Particularly, this invention is related to a method for manufacturing carpet/fabric panels without the use of energy directors such as carpet engaging pins.

BACKGROUND OF THE INVENTION

Automobile car door panels typically are formed of a thermoplastic substrate that can be formed using injection molding, thermoforming, extrusion or vacuum forming. It is often desired to cover sections of this panel with another material such as a synthetic fiber carpet or a fabric or another material. This covering can be for aesthetic and/or functional purposes.

Known production processes used for bonding materials to door panels require additional consumables. These can include, but are not limited to, glue, staples, clips and other mechanical means. Such additional consumables tend to affect the re-cyclability of the thermoplastic substrates to which the carpet/fabrics are bonded.

Other known bonding processes include linear or orbital vibration welding. U.S. Pat. Nos. 5,026,445 and 5,468,335, for example, disclose a thermoplastic substrate and a synthetic fiber carpet bonded together by a vibration welder generating frictional heat at an interface between the substrate and an underlying carpet. Specifically, both U.S. Pat. Nos. 5,026,445 and 5,468,335 disclose the use of a platen having a pattern of closely spaced pins. These pins are capable of penetrating the loft of a carpet and serve as energy directors with which a backing layer of the carpet can be welded to the thermoplastic substrate at the regions opposite to the pins.

The above-mentioned patents disclose welding processes that make use of the fact that thermoplastics will remelt with the application of heat and then resolidify once the heating ceases. These processes do not require mechanical devices for the attachment of the pieces to be welded.

One of the difficulties incurred in using the above-described welding processes is that they require the carpet layer to be subjected to localized contact either with ultrasonic horns or engaging pins used in vibration welding as taught by U.S. Pat. Nos. 5,026,445 5,468,335. This localized contact, though indispensable for the disclosed processes, causes a marking or formation of telltale pin dents in the carpet welded to the plastic panel. To eliminate the dents it is then necessary to brush, comb or otherwise smooth out the effects of these processes upon the carpet surface.

Another difficulty in using the welding apparatus described in these patent is that the manufacture of platens with pins involves an expense.

SUMMARY OF THE INVENTION

With a vibration welding technique in accordance with the present invention there is no localized pin contact with the fabric and, therefore, there are no markings or pin dents to be removed or brushed out. The term fabric as used herein includes heavy fabrics such as carpets as well as lighter weight and thinner fabrics which, when used with this invention are usually backed by a thicker backing layer. The fabric may be a woven or non-woven material.

With the welding of a fabric in accordance with the invention, the fabric is virtually unaffected from a visual standpoint and no further steps need to be taken to restore the appearance of the fabric.

Instead of relying upon the use of a fixture having a specified pin structure, with the pins selected to penetrate the piles of a carpet, to produce localized contact between the fabric and the substrate, both the substrate and the fabric are transformed so as to be a part of the welding structure.

This is achieved with one method according to the invention by placing a flexible fabric consisting of a plurality of distributed high density and low density regions on a substrate so that a bottom surface of the fabric is in intimate pressurized contact with the substrate at an interface which extends over an effectively continuous and substantial portion of the bottom surface of the fabric. The high and low density regions may be an integral part of a carpet or of the backing layer attached to a fabric.

The fabric and substrate are then displaced relative to one another while in intimate pressurized surface contact until substrate zones located juxtaposed to high density fiber regions are softened to cause either an interpenetration or fusion of the high density regions with the softened substrate zones. When the displacing step is stopped the softened zones can harden and form a large number of distributed bonds between the fabric and the substrate.

The invention contemplates directly attaching the back surface of a fabric to the thermoplastic substrate even when there are no high and low density regions in the fabric. When the substrate has a textured surface with tiny raised regions the fabric can be directly vibration welded to the substrate. The substrate can have a planar surface or be contoured.

With a method of this invention various materials can be vibration welded to a thermoplastic substrate. Thus the material can be a carpet, which may have a backing layer or its backing layer can even be dispensed with. The carpet can have regions, that may not necessarily be fused with the substrate but because of their higher densities cause a melting of the underlying substrate and thus form a bond thereto by penetrating the softened zones.

The material can be a flexible fabric, which in most cases has a backing layer that can be vibration welded to the substrate without causing a destruction of the fabric due to the use of pins as taught by the above vibration welding patents. The material can be a vinyl layer with either sufficient thickness to be directly welded to the substrate or with an intermediate backing layer. The term fabric as used herein, therefore, includes such materials as a heavy fabric or carpet, vinyl with a backing layer and other similar thin materials that can be directly vibration welded to thermoplastic substrates in accordance with the invention.

When a fabric is vibration welded to a thermoplastic door panel a large selection of colors and patterns can be employed for an enhancement in the appearance of the door panel.

The invention also contemplates using a thermoplastic substrate whose outer surface is textured with a plurality of distributed tiny raised regions. Where these regions are juxtaposed to an inner surface of the fabric, bonding regions are formed at an interface between the inner surface and the substrate's outer surface. Where, these tiny raised regions on the substrate are opposite the carpet/fabric, preferential bonding regions are produced from the vibration welding and these are widely distributed so as to form distinct and extensively distributed bonded zones. The result is a well bonded fabric.

The scope of the invention includes the method for vibration or orbital welding of a carpet/fabric to a three dimensionally contoured substrate such as commonly found on car door panels and the like. Such welding involves placing the substrate and fabric between a pair of similarly three dimensionally contoured platens whose active surfaces are substantially parallel and without pins. The term vibration welding as used herein includes orbital welding.

Another feature of the invention involves the use of tooling that can be more easily prepared for a vibration welding application. Thus with tooling in accordance with the invention upper and lower tools are provide with typically the lower tool being moveable to engage the upper tool with pressure while the substrate and fabric workpieces are between them. The lower tool has a workpiece engaging surface shaped to match that of the contour of the substrate workpiece. This surface is provided with an appropriate amount of friction to grip the fabric without slipping.

The lower tool is preferably segmented with segments having surfaces adapted to conform to the contour of the back of the substrate that is to be bonded to the fabric. The segments are adjustable so as to assure appropriate surface wide pressure contact for area wide bonding between the fabric and the thermoplastic substrate. If necessary, the contacting surfaces of the segments are provided with enhanced friction to avoid slipping of the substrate.

With vibration welding tools in accordance with the invention the use of pins as required by the prior art can thus be advantageously avoided.

It is therefore an object of this invention to provide an improved method for vibration welding of a fabric to a substrate while overcoming the drawbacks of the above-described prior art.

Another object of the invention is to provide a method of manufacturing soft material covered panels using vibration welding for bonding a carpet or other fabric to a thermoplastic substrate without damaging the decorative surface of the fabric.

Yet another object of the invention is to provide a method, utilizing vibration welding, for bonding a fabric directly to a thermoplastic substrate.

Another object is the invention is to provide a vibration welding method for bonding an interstitial surface of a carpet having a backing layer with a thermoplastic substrate.

Still another object of the invention is to provide a vibration welding method for directly bonding a fabric to a thermoplastic substrate surface having a textured outer surface with tiny raised regions.

Yet another object of the invention is to provide a vibration welding method for bonding a carpet or other fabric having low and high density regions to a thermoplastic substrate, which has a smooth surface.

Yet another object of the invention is to provide a tool for vibration welding of fabrics to thermoplastic substrates of different contours.

BRIEF DESCRIPTION OF THE DRAWINGS

The above and other objects, features and advantages will become more readily apparent form the following detailed description of the invention, references being made to the following accompanying drawings in which:

FIG. 16 is an explanatory plane view of a substrate surface with the ratio of randomly scattered variously sized bonding areas versus non-bonding areas equal approximately 30% bonding to 70% nonbonding;

FIG. 16A is a cross-sectional view of the substrate of FIG. 16;

FIG. 17 is the same view as the one shown in FIG. 16 but with the ratio of randomly scattered variously sized bonding areas versus non-bonding areas equal approximately 50% bonding to 50% nonbonding;

FIG. 17A is a cross-sectional view of the substrate shown in FIG. 17;

FIG. 18 is an explanatory plane view of a distribution of raised areas versus depressed areas on the substrate surface of a substrate of an assembly manufactured according to the invention as shown in FIGS. 11–14 and including a fabric layer made of a woven material;

FIG. 18A is a cross-sectional view of the substrate shown in FIG. 18;

FIG. 19 is an explanatory plane view of a more uniform distribution of raised areas versus depressed areas manufactured according to the invention;

FIG. 19A is a cross-sectional view of the substrate shown in FIG. 19;

DETAILED DESCRIPTION OF THE DRAWINGS

Figures 1, 2:
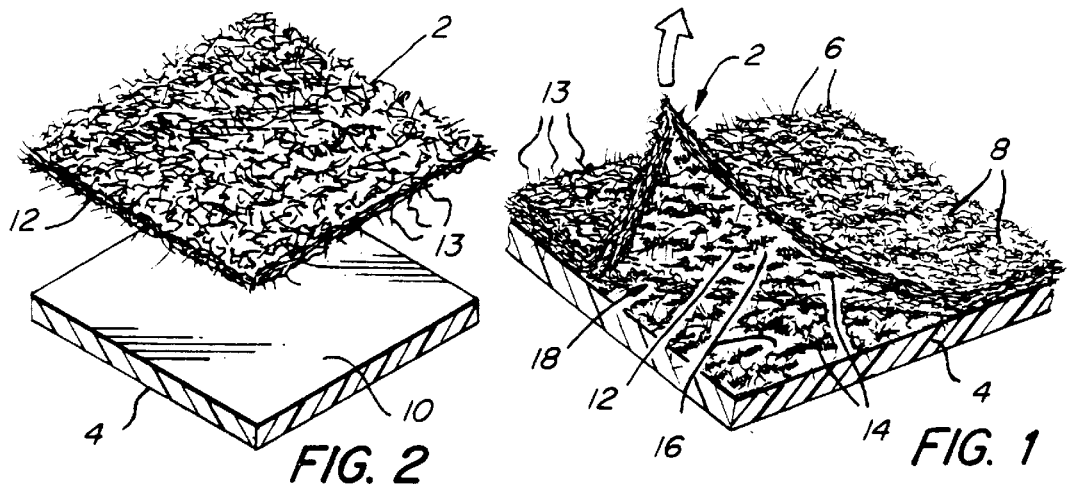
FIG. 1 is a perspective view of an assembly of a carpet made of a non-woven material bonded in accordance with the invention to a substrate having a smooth surface.
FIG. 2 is an exploded perspective view of the assembly shown in FIG. 1.
Figures 3, 4:
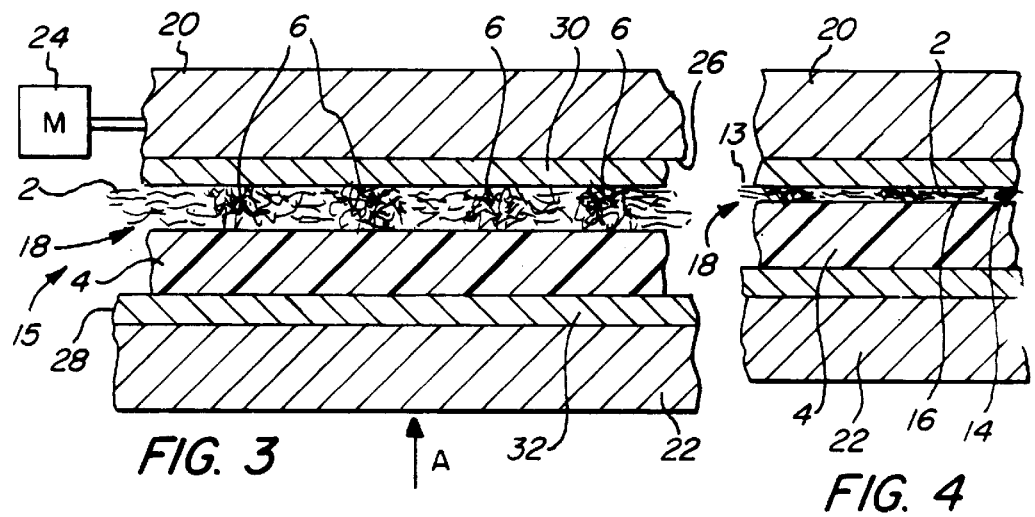
FIG. 3 is a partial sectional schematic view of a vibration welder shown prior to forming the assembly of FIG. 1.
FIG. 4 is the same view of the welder as in FIG. 3 but during a welding operation.

With reference to FIGS. 1–4 an assembly 1 of a substrate 4 and a fabric in the form of a carpet 2 are conflated together in accordance with a method of this invention. The carpet 2 can be made of a mat, fleece or felt or other material each of which includes a plurality of high density fiber regions 6 and low density fiber regions 8. The carpet back surface 12 according to this embodiment is directly bonded by vibration welding to a smooth surface 10 of a thermoplastic substrate or panel 4 by means of a vibration welder, as shown in FIGS. 3 and 4. The technique of vibration welding is well known and typically involves pressing the carpet and substrate together between a pair of platens engaging platen used with this invention is preferably prepared with enhanced friction to enable a firm gripping of the fabric. During pressurized contact between the platen one of the platen; typically the upper platen is moved for a preselected time to create heat from the frictional contact and thus a fusion or other bonding of portions of the contacting substrate and fabric surfaces.

Upon peeling of the carpet 2 from the substrate 4 in a direction indicated by arrow "C", it can be seen that the surfaces 10 and 12 have a plurality of bonded zones 14 which are scattered pseudo-randomly over the surfaces 10, 12. These bonded zones substantially correspond to the high density fiber regions 6 of the carpet 2.

This result is achieved by initially placing the face 12 of the carpet 2 proximate the smooth surface 12 of the substrate 4 as shown in FIG. 3. The carpet 2 and the substrate 4 are placed in an orbital or vibration welder 15 having platens 20, 22. These platens 20, 22 are displaceable relative to each other in a direction shown by arrow A. In this embodiment, for example, the lower platen 22 is displaceable toward the upper platen 20, though one could conceivably reverse this.

The carpet 2 is placed on the substrate 4, so that the bottom surface 12 of the carpet 2 can be intimately pressed against the substrate surface 10 and form an interface 18 between these surfaces. The interface 18 extends over an effectively continuous and substantial portion of the bottom surface 12 of the carpet 2. Once the substrate 4 and carpet 2 are in pressurized contact, a motor 24 applies translation motion to one of the platens, for example the upper platen 20, with either a vibration or orbital motion as is well known in the art. Active surfaces 26, 28 of the platens 20, 22 are parallel and may be substantially flat or three-dimensionally contoured and are not interrupted by pins or the like as disclosed in some of the aforementioned vibration welding patents.

As seen in FIG. 4, frictional heat generated at the interface 18 between the mating surfaces 10, 12 causes a softening of the substrate's plastic material which is immediately adjacent to the collapsed fibers of high density fiber regions 6. Since the fibers 13 which, in this embodiment, are at least partly formed of a thermoplastic material, may also soften and flow in response to the dissipation of frictional heat, the carpet 2 and substrate 4 bond at the zones 14 of the interface upon cooling.

The low density fiber regions 8 of the carpet 2 generate less frictional heat that may not be sufficient to melt underlying thermoplastic substrate 4 at zones 16. As a result, the interface 18 between the surfaces 10, 12 has a plurality of zones 16 which provide either a weaker bond between the surfaces 10, 12 than the zones 14 do or show no bond at all.

After the vibration welding has caused a fusion or an interpenetration of fibers 13 at the high density regions 6, usually in a short time of the order of a few seconds, the motion is stopped. Upon cessation of the relative motion between the substrate 4 and carpet 2 a cooling takes place resulting in hardening of the zones 14 and thus the formations of a plurality of bonded regions corresponding to the high density fiber regions 6 of the carpet 2.

The platen parallel facing surfaces 26, 28 should be capable of gripping the carpet 2 and substrate 4 respectively with sufficiently high friction to cause a bonding at the interface 18. This can be achieved by covering facing surfaces 26, 28, or one of them, with friction enhancing material layers 30, 32 respectively which, in turn, contact the carpet 2 and substrate 4. The layers 30, 32 may be an integral part of the platens 20, 22 such as by preparing surfaces 26, 28 with a plasma coating of a grit with the desired roughness. Alternatively separate mounted layers of sand paper or emery cloth are placed on surfaces 26, 28. In most cases only one of the layers 30 for the upper surface 26 is needed.

The friction enhancing material layers 30, 32 preferably is a plasma place grit having a roughness equivalent to that of a sand paper having a roughness between 80 -to about 120 guage. The layers 30, 32 can be formed of a material such as rubber, urethane, a textured metal surface or even an emery or sand paper layer like material as is commonly used in vibration welding of plastic pieces. The shape of the contacting surfaces of the layers 30, 32 may be configured to be flat or contoured, depending upon the shape of the substrate and carpet shapes to be bonded. It is preferred that the contour of the platen facing surfaces 26, 28 conform to the shape of the portion of the substrate 4 to which the fabric 2 is to be bonded.

The upper platen or medium 20 is used to provide intimate support for the carpet 2 to be welded. This platen has the ability to not only support but also to be adjustable to provide locally differing forced engagement pressures in those areas of the application requiring such pressure differences. The requirement for this adjustability is to compensate for vibration welding of the substrate 4 to a carpet 2. These adjustable areas can be either "static" requiring the addition or removal of shims or spacers, or "dynamic", which will respond to externally initiated input.

The lower platen or medium 22 is used to provide intimate support for the substrate 4 to which the carpet 2 is to be welded. This platen will have the ability to not only support but also to be adjustable to provide locally differing forced engagement pressures in those areas of the application requiring such pressure differences. The requirement for this adjustability is to compensate for vibration that occurs in the bonding of the substrate 4 to the carpet 2. These adjustable areas can be either "static" requiring the addition or removal of shims or spacers, or "dynamic", which will respond to externally initiated input.

The thermoplastic substrate 4 is a material commonly used for interior car door panels and is preferably made of ABS, blends of ABS, polypropylene or any other material having thermoplastic characteristics. The substrate 4 may be formed by injection molding, thermoforming, extrusion or vacuum forming and be utilized as a part of carpeted interior parts of a vehicle, thus having a variety of forms and shapes.

The invention, however, is not limited to the interior of a vehicle and a method according to the invention can be used to manufacture carpet or fabric covered panels for different purposes and industries as well. Although the substrate 4 as shown in FIG. 1 has a planar substrate face 10, this face may have a three-dimensional contoured shape, as usually is the case with a carpeted interior of a vehicle for its armrests, doors and the like as will be explained below.

Combined with thermoplastic material of the carpet 2 may be mixtures that are made of any of natural, regenerated fibers, cellulose acetate fibers, semi-synthetic, synthetic, or mineral fibers or mixtures of two or more of the above mentioned types of fibers.

Natural fibers may be, for example, linen, jute and cotton. Regenerated fibers may include, for example, rayon. Semi-synthetic fibers may be cellulose acetate fibers, whereas synthetic fibers include nylon, polyacrylic and polyolefin. Mineral fibers may be made of glass.

Figures 5, 6:
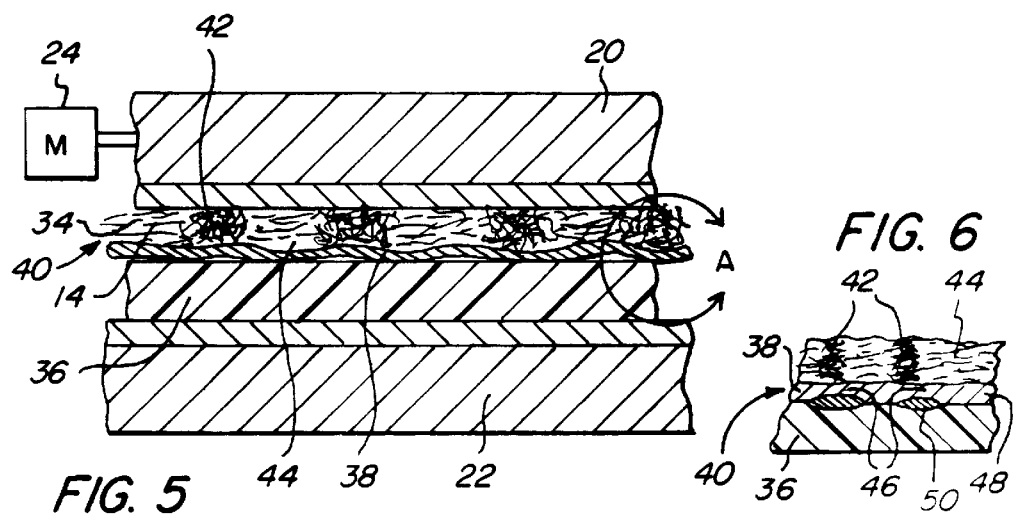
FIG. 5 is a partial sectional schematic view as in FIG. 3 of a vibration welder with an assembly including a different fabric in the form of a carpet having a backing layer.
FIG. 6 is an enlarged view of the detail A in the assembly illustrated in FIG. 5.

An embodiment illustrated in FIG. 5 has a carpet 34 which has a backing layer 38 forming an interface 40 with a thermoplastic substrate 36. Similar to the carpet 2 of FIG. 1, the carpet 34 is formed of a non-woven material having high-density fiber regions 42 and low density fiber regions 44. An assembly of the carpet 34, backing layer 38 and substrate 36 is placed between the platens 22, 20 of the vibration welder 14 which is identical to the one of FIGS. 3,4.

As shown in FIG. 6, the relative motion between the platens 20, 22 generates sufficient frictional heat at the interface 40 between areas 46 of the backing layer 38, which are adjacent the high density fiber regions 42, and substrate surface 48. The-frictional heat causes a thermoplastic material of at least the substrate 36 and usually also a small region 46 of the backing layer 38 adjacent thereto, to soften or melt at a plurality of separate zones 50. Upon cessation of the relative displacement of the platens, the interface 40 has a plurality of bonds at the zones 50.

Thermoplastic materials of which the carpet backing layer 38 and the substrate 36 preferably have similar melting temperatures so as to enhance conflation of the carpet 34 and substrate 36.

A particular advantage of the embodiments shown in FIGS. 1–6, is that a vibration weld between the carpet and a substrate can be made without the use of a backing layer 38 and thus present a significant cost saving.

Figure 9:
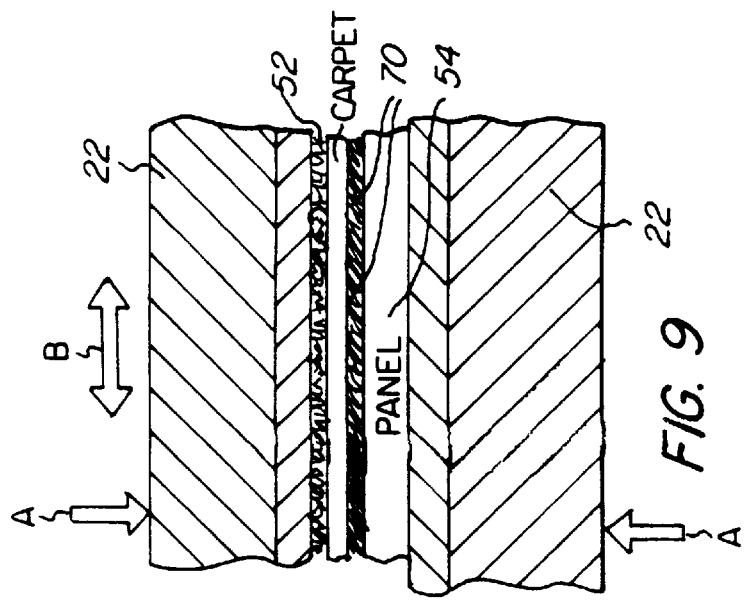
FIG. 9 is the same view as FIG. 8 during a welding operation.
Figure 8:
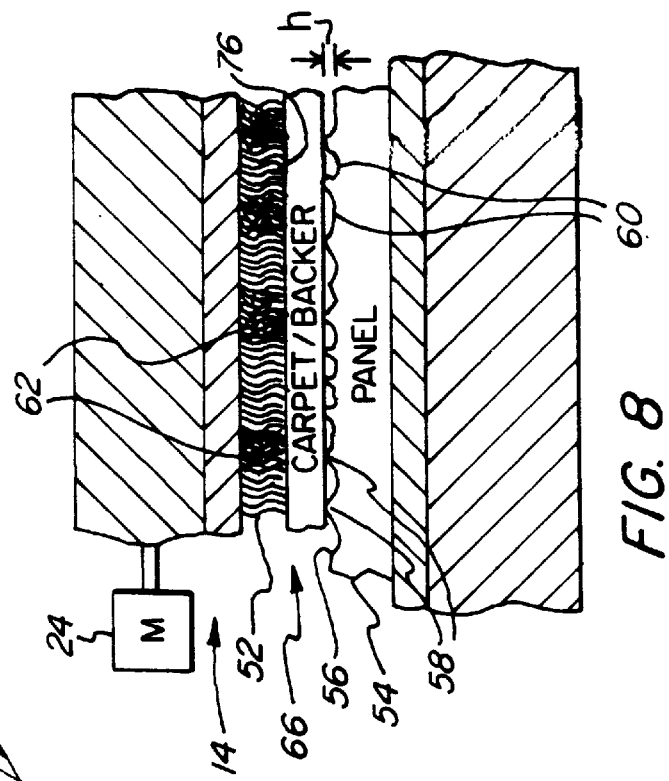
FIG. 8 is a partial sectional enlarged, out of scale, view of the vibration welder receiving the carpet and substrate as shown in FIG. 7.
Figure 7:
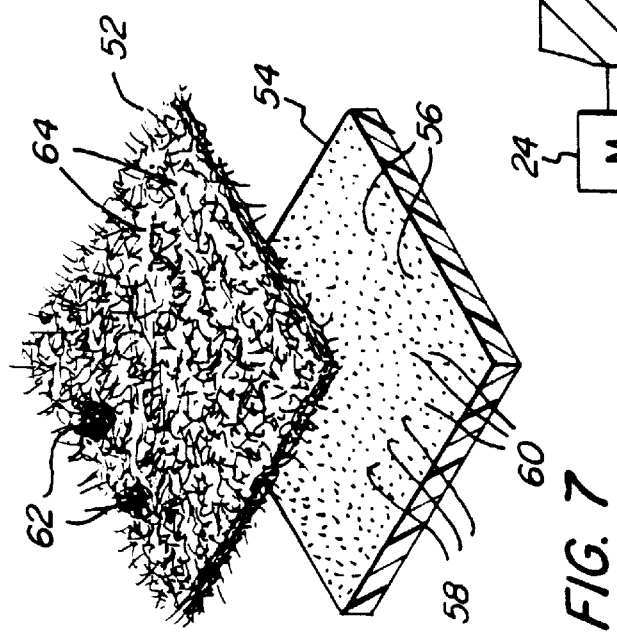
FIG. 7 is an exploded perspective view of a textured substrate and a non-woven fabric in the form of a carpet to be bonded according to the invention.

According to another embodiment of the invention as shown in FIGS. 7–9, a thermoplastic substrate 54 is formed with a textured substrate surface 56 which has tiny raised areas 58 and depressed areas 60. The substrate surface 56 is placed in intimate contact with a carpet layer 52.

FIGS. 8 and 9 illustrate a method of vibration or orbital bonding of the embodiment of FIG. 7. As shown here, the carpet 52 is formed with a backing layer 76. However, it is understood that the carpet may be formed without the backing layer and be bonded directly to the substrate as explained in regard to FIGS. 3 and 4. The backing layer 76 forms an interface 66 between its inner surface and a support surface 56 of a substrate 54 which is formed with a plurality of raised areas 58 alternating with depressed areas 60.

Referring to FIG. 9, after either of the platens 20, 22 is displaced inwardly in a direction of the arrow A, the platens move relative to one another in the directions of double headed arrow B. The fibers in carpet 52 are collapsed and sufficient force is generated to cause a melting of the tops of the raised areas 58 to form a plurality of melted zones 70 where the carpet 52 becomes welded to the substrate 54. The substrate 54 thus acts as part of the welding apparatus in that it provides bonding zones 70 at the interface 66 where a fusion between the workpieces can be formed. After the vibration weld has been made and the assembly of the substrate 54 and attached carpet 54 are removed, the resilience in the fibers enables a self-restoration of the carpet fibers.

The raised and depressed areas 58, 60 can be alternatively formed by providing the backing layer 76 with a textured face. In this case, the face 56 of the substrate 54 can be flat.

Respective heights h of these areas 58, 60, i.e. a distance between the peak of the raised areas and the bottoms of the depressed areas should be at least about 0.003 inches and preferably is in the range from about 0.003 to about 0.1 inch. The distribution of raised and depressed areas can vary with sufficient raised areas distributed over the surface 56 of the substrate to enable a reliable weld to be formed with the overlying carpet 52, regardless of whether the carpet has a backing layer 52.

Figure 10:
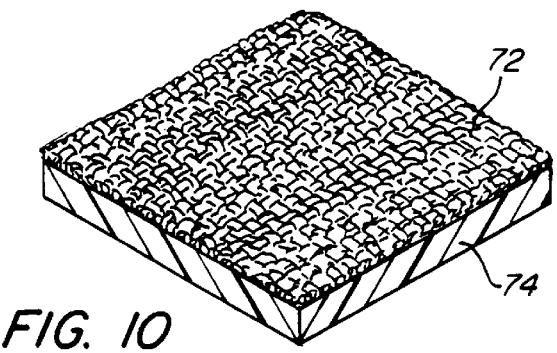
FIG. 10 is a perspective view of an assembly manufactured according to a method of the invention for a fabric such as a carpet or a thinner fabric made of a woven material.

Another embodiment of the invention is illustrated in FIG. 10 showing an assembly including a substrate 74 bonded with a carpet 72 which is made of a woven material.

Figure 12:
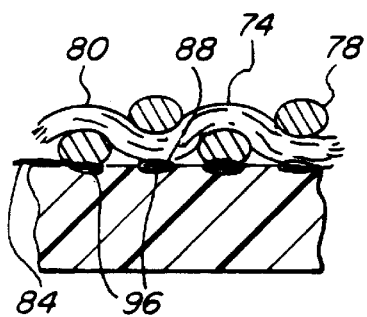
FIG. 12 is an enlarged view of an interface of the assembly shown in FIG. 11.
Figure 11:
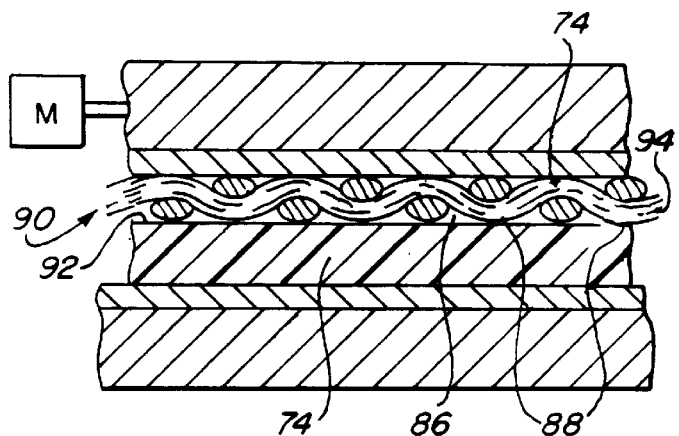
FIG. 11 is a partial sectional view of a vibration welder prior to forming the assembly as shown in FIG. 10.

FIGS. 11 and 12 illustrate a method of vibration or orbital bonding of the carpet 72 and substrate 74 shown in FIG. 10. The woven material of the carpet 72 carpet is formed by warp yarns 74 and weft yarns 78. These form a plurality of interstices 86 alternating with ridges 88 which are in pressurized contact with the substrate surface 92 at an interface 90.

During vibration welding, sufficient force is generated to cause a melting of at least small portions of the substrate surface 92. As a result of melting, the interface 90 has a plurality of substrate bonding zones 96 adjacent to the ridges 88 of the carpet 72 wherein portions of the carpet 72 can interpenetrate the melted substrate 74 zones and thus form bonds therewith after cessation of welding.

Figure 14:
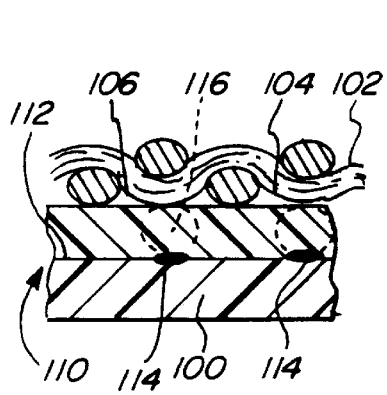
FIG. 14 is an enlarged view of a portion of an interface of the assembly shown in FIG. 13 during a welding operation.
Figure 13:
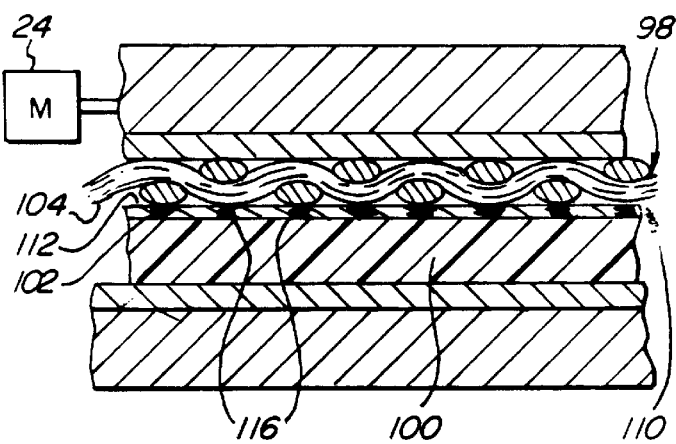
FIG. 13 is a partial sectional view as in FIG. 11 but with a fabric such as carpet or thinner fabric with a backing layer.

FIGS. 13 and 14 illustrate an embodiment in which a carpet or other fabric 98 is made of a woven material and has a thin backing layer 102. The woven nature of the fabric 98 has ridges 104 . The backing layer 102 may be affixed to the fabric 98 with an adhesive as is standard in the art.

In accordance with the method of the invention, the motor 24 imparts translational motion to one of the platens thus displacing the fabric 98 and substrate 100 relative to one another. As a result of frictional heat generated by the relative displacement, zones 116 of the backing layer 102 are in intimate pressurized contact with respective adjacent softened regions 114 of the substrate surface 112 and over an effectively substantial portion of the bottom surface of the backing layer 102.

After the relative displacement of the substrate 100 has ceased and the softened zones 114 cool distributed bonded regions 114 are formed between the backing layer 102 of the carpet and the substrate 100 over at least a substantial portion of the interface 110. The backing layer imparts a softened feel to the substrate after the fabric is welded or bonded to it. When a thinner regular fabric other than a carpet is used the surface of the fabric has no pin markings and is not destroyed by the vibration welding process.

Figure 15:
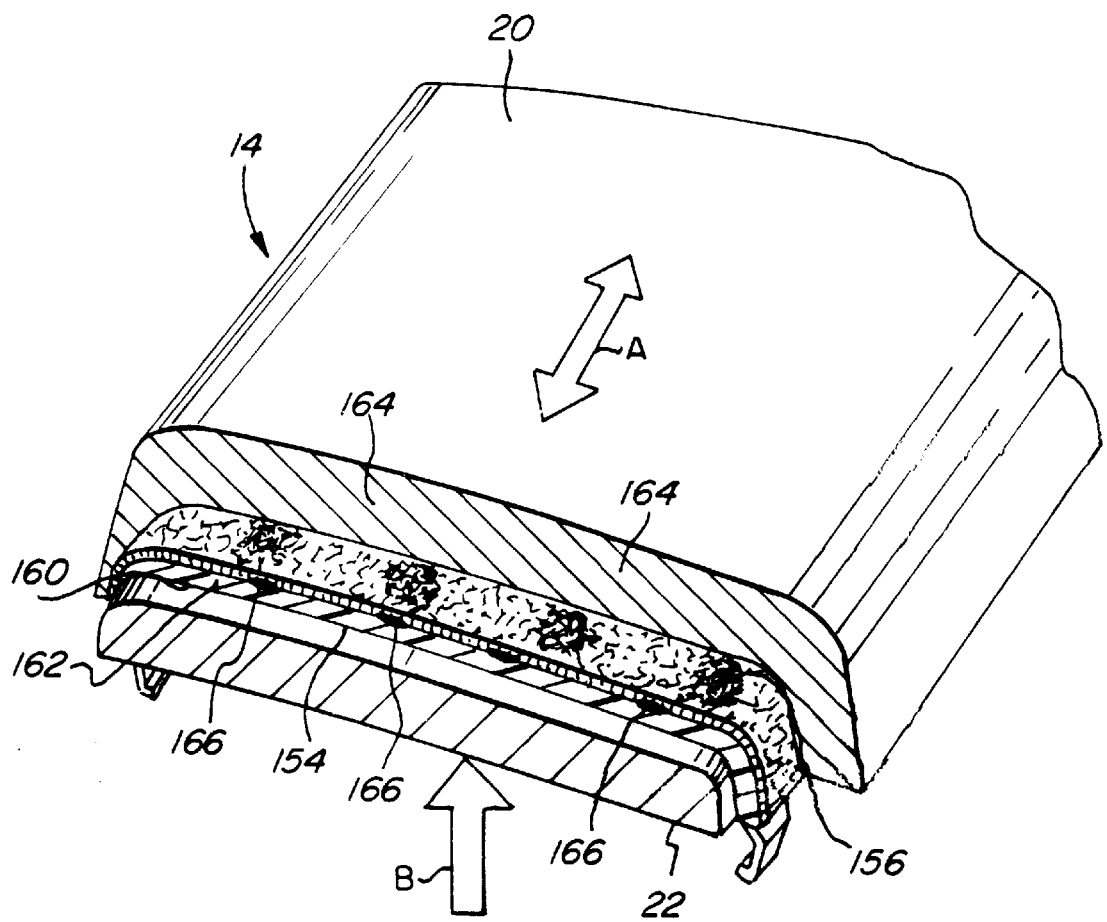
FIG. 15 is a perspective and partially broken away view of a welder implementing a method according to the invention.

FIG. 15 illustrates manufacturing of an automobile door handle according to a method of the invention. A three dimensionally contoured substrate 154 is placed on an active surface 152 of one of a pair of platens 20, 22. The platens are similarly shaped to the three dimensionally contoured substrate 154, so that active surfaces 154 and 142 of these platens are effectively parallel to one another.

After a fabric 156 and the substrate 154 are brought in intimate pressurized contact due to displacement of the platen 22 in a direction of arrow B, the platens are displaced relative to one another in a direction of arrow A. This relative motion of the platens generates frictional heat at an interface 160 between the fabric and a substrate surface 162 of the substrate 154 sufficient to soften regions 166 of the substrate surface 162 which are juxtaposed with a plurality of high density fiber regions 164 of the fabric 156.

After ceasing the relative displacement of the platens and cooling of the substrate surface 162, solidified regions 166 become bonds between the fabric and the substrate.

FIGS. 16 and 16A depict a random scatter of bonding zones 120 and non-bonding zones 121 formed at the interface between the mating faces of a carpet and a textured substrate as described in regard to FIG. 7 illustrating a carpet. In this case the ratio of the bonding regions to non-bonding regions is approximately 30% bonding zones 120 to 70% non-bonding zones 121.

The height, h, of bonding regions 120 relative to the adjacent areas can be as small as about a thousandth of an inch though preferably it is a minimum of 0.003 thousandths of one inch to a maximum of 0.100 thousandths of an inch, as is seen in FIG. 16A.

FIGS. 17 and 17A depict a random scatter of the bonding zones 122 formed between substrate 54 and the carpet 52 of FIG. 7 having a backing layer. The ratio of the bonding regions 122 to non-bonding regions 123 at an interface between the backing layer and the substrate approximately equals 50% to 50%.

It is easy to see on FIG. 17A that distribution of the bonding zones is more uniform than in the embodiment shown in FIG. 16. The height of bonding regions 122 relative to the adjacent areas is generally the same as in FIG. 16A.

FIGS. 18 and 18A depict a distribution of bonding regions versus non-bonding regions formed at an interface between bonded workpieces as described in reference to the embodiment of the carpet made of a woven fabric as illustrated in FIGS. 10–13. The ratio of these bonding regions to non-bonding regions is also approximately 50% bonding 50% non-bonding, as shown in FIG. 18A.

While FIGS. 16–18 show a random scatter of the bonding regions, it is possible to manufacture assemblies according to the invention with a uniform distribution of these regions. As shown in the embodiments in which the substrate is provided with a plurality of raised areas (FIGS. 7–9), these areas may also be distributed in rows, or on a bias, or in circles. According to the invention, the carpeted assembly including such substrates with the patterned surfaces may have a plurality of bonding regions forming a continuous ridge. Alternatively, the carpeted assembly may be formed with a plurality of intersecting rows or ridges forming the bonding regions. The top face of these raised areas on the substrate's surface may be flat, curved or pointed.

As an example, FIGS. 19 and 19A, illustrate a uniform distribution of bonding regions 126 corresponding to a plurality of uniformly distributed raised areas 128 which are formed on a substrate 130. The height of these raised areas 128 is the same as in the previous examples and typically varies between 0.003" (three thousandths) of one inch and a 0.100" (a tenth of an inch).

Figure 20:
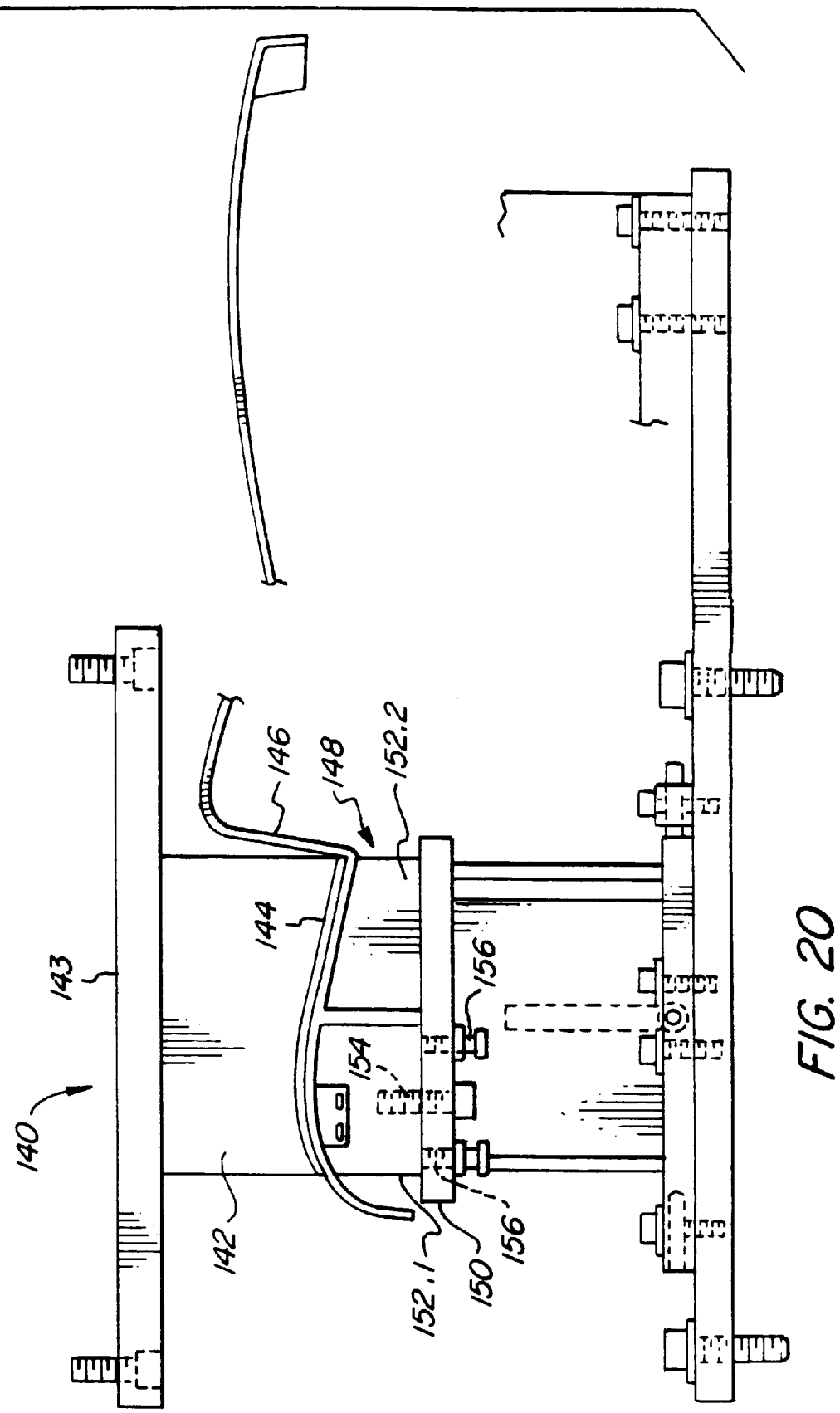
FIG. 20 is a partial side section and broken away view of one tooling in accordance with the invention to vibration weld a fabric to a thermoplastic substrate.
Figure 21:
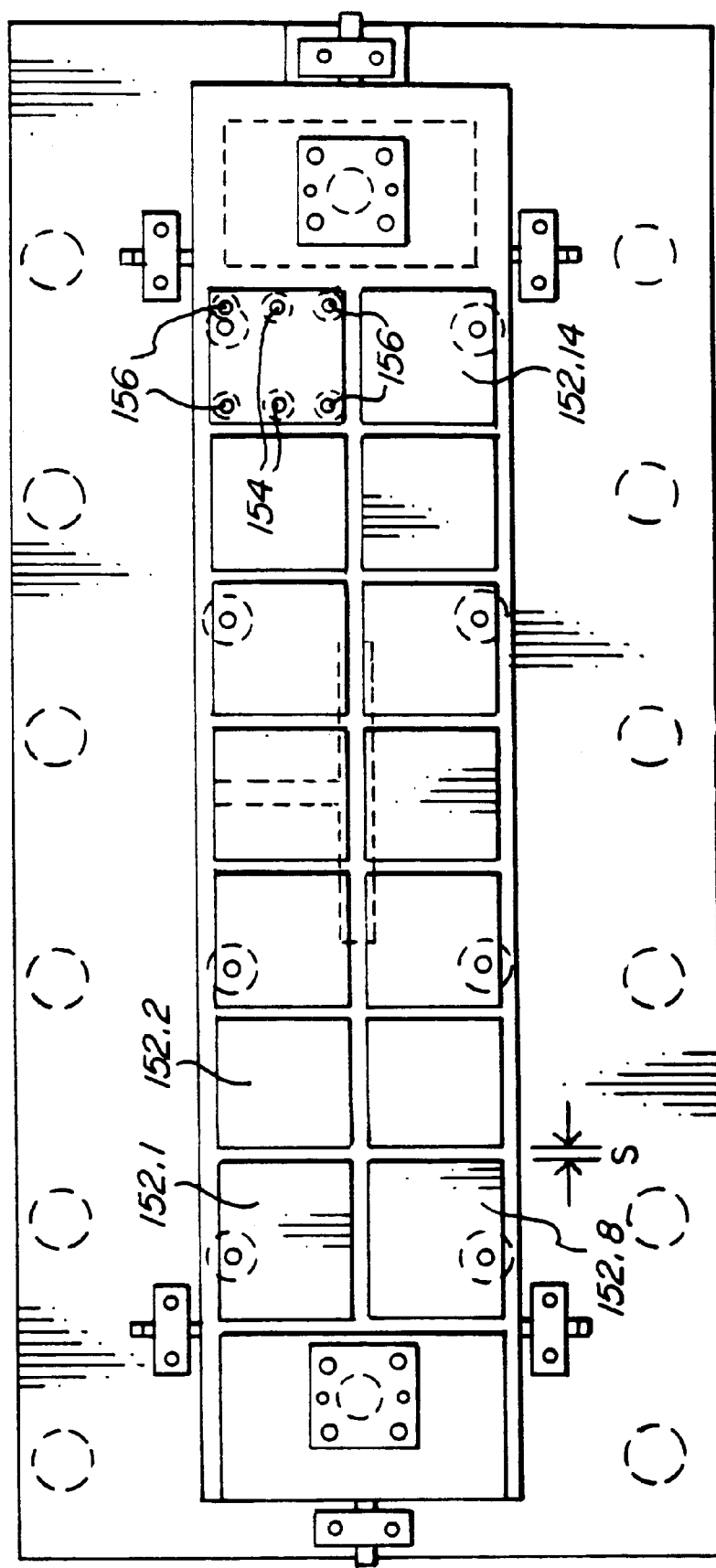
FIG. 21 is a partial plan view of a lower tool in accordance with the invention.
Figure 22:
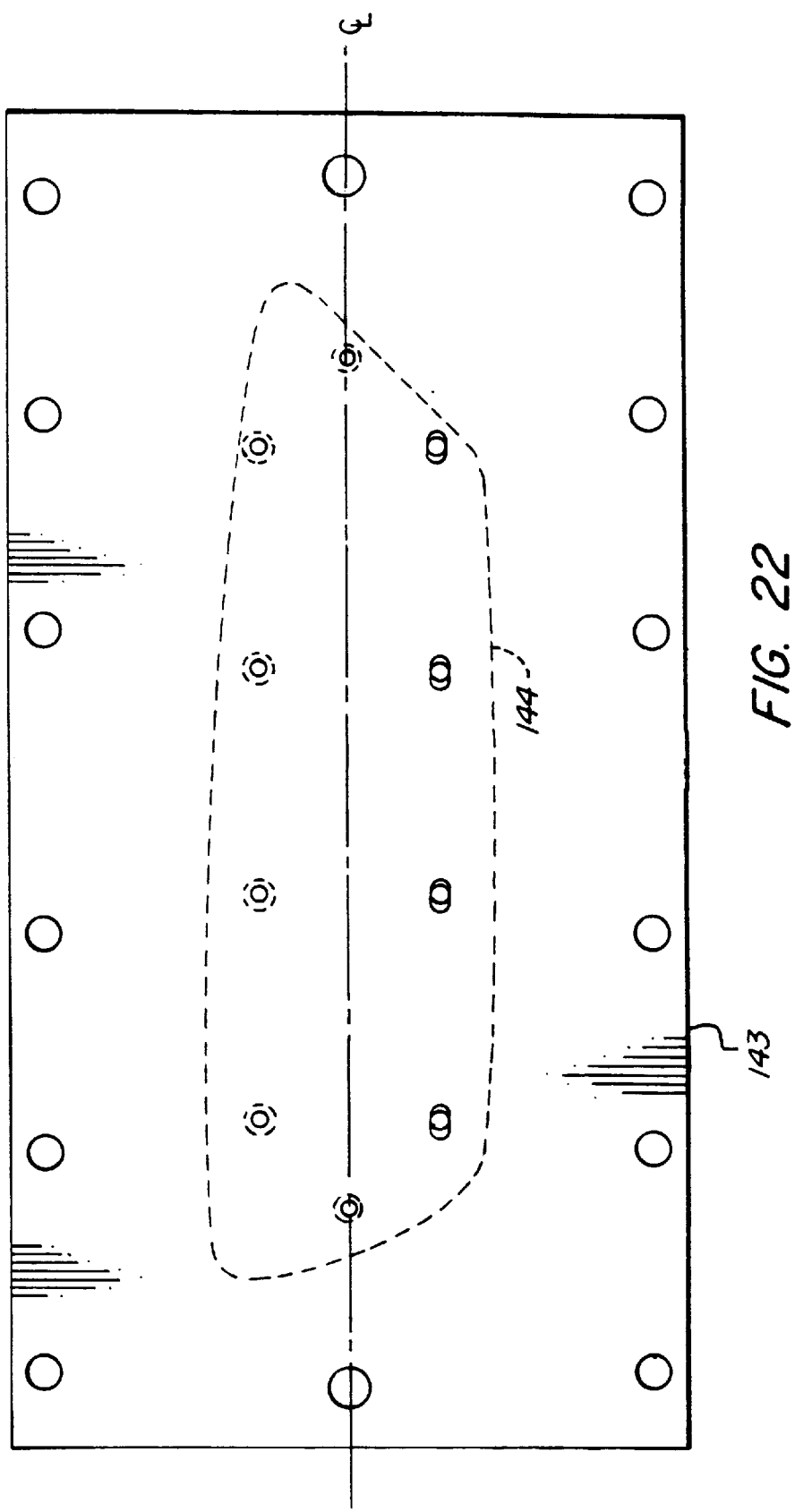
FIG. 22 is a partial plan view of an upper tool in accordance with the invention and used with a segmented tool as shown in FIG. 21.

In FIGS. 20–22 a tool 140 in accordance with the invention is shown wherein an upper platen 142 mounted on an upper plate 143 has a fabric contacting surface 144 contoured to complement the shape of the substrate workpiece 146. A lower platen 148 is mounted on a plate 150 and is formed of a plurality of individual segments 152.1, 152.2 as shown in FIG. 20 and in total for the particular workpiece or substrate 146 a total of 14 segments as shown FIG. 21. The number of segments may vary.

Since the contact by the upper platen 142 extends over a wide area the force between platens 142 and 148 spread out. This may cause an uneven contact by the lower platen and a correspondingly uneven bonding of a fabric with the substrate 146. Accordingly, making the lower platen 148 of individual segments which are made adjustable, the bonding between a fabric and the substrate 146 is made consistent with evenly distributed bonding zones.

Segments 152 are, therefore, so mounted on the lower plate 150 that these can be individually adjustable or tiltable. As shown in FIGS. 20 and 21, each segment is mounted to plate 150 with one or preferably several hold-down screws 154 and four evenly spaced jacking screws 156. The individual segment such as 152.1 can thus be tilted by releasing the hold down screws 154 and moving the jacking screws either up or down. The individual segments 152 may vary in size, with for example some having about 2×3 inches surface areas. The spacing between adjacent segments typically is very small so as to provide adequate surface support for the substrate.

The adjustability of the segments can be achieved with other mechanical devices, which can be pneumatically or hydraulically controlled.

The adjustment of the segments 152 is done by first welding fabric to a substrate for which the tool 140 is designed and then inspecting the bonding of the fabric with the substrate. Any areas that show some regions to have been inadequately bonded to the substrate are then shimmed up or the appropriate segments 152 so tilted as to increase contact with the substrate's back surface. The substrate being sufficiently flexible to transfer this adjustment into an improved bonding contact with the fabric.

The upper platen 142 is preferably has a continuous surface 144 to engage the fabric to vibration welded. The surface is prepared with a suitable friction enhancing material as previously described so as to be able to grip a fabric without slipping during vibration welding or bonding as the case may be.

Having thus described several embodiments in accordance with the invention its advantages can be understood. The embodiments shown herein are for example and illustration of the invention so that one of ordinary skill on the art may modify the methods and articles taught by the invention as has been described herein without departing from the scope of the following appended claims:

What is claimed is:

1. A tool for vibration bonding of a fabric to a thermoplastic substrate comprising:
    a first platen and a second platen, said platens having opposed facing surfaces which are substantially matching surfaces;
    a friction-enhancing element mounted directly on at least one of said surfaces to enhance frictional contact between said fabric and thermoplastic substrate.

2. The tool as claimed in claim 1, wherein said one surface has been randomly roughened.

3. The tool as claimed in claim 1 wherein said one surface has been treated to support a plasma formed grit.

4. The tool as claimed in claim 2 wherein said grit is sized in roughness in the range from about 20 to about 200 gauge.

5. The tool as claimed in claim 1 wherein said surface has been sand blasted.

6. The tool as claimed in claim 1 wherein the other of said platen is segmented with individual segments being adjustable for even contact between the substrate and said fabric.

7. The tool as claimed in claim 1 wherein said surface is covered by a layer of material selected for enhanced frictional contact with said fabric.

8. A tool for vibration bonding of a fabric to a thermoplastic substrate comprising:

an upper and a lower platen, said upper and lower platen having opposed facing smooth surfaces, said upper surface having enhanced frictional contact with the fabric and with said thermoplastic substrate, respectively, at least one of said platens having a plurality of individual segments, each of which has a respective center axis extending toward the other platen; and a plurality of individually adjustable elements engaging a bottom of each of individual segments of the at least one of the platens to enable each individual segment to be controllably linearly displaceable along and tiltable about the center axis in order to increase contact for establishing an even bonding contact between the substrate and said fabric.

9. The tool as claimed in claim 8 wherein said upper surface is randomly roughened.

10. The tool as claimed in claim 8 wherein said upper surface has been sand blasted.

11. The tool as claimed in claim 8 wherein said upper surface is covered by a material having enhanced friction for gripping of the fabric.

* * * * *

UNITED STATES PATENT AND TRADEMARK OFFICE
CERTIFICATE OF CORRECTION

PATENT NO. : 6,227,275 B1
DATED : May 8, 2001
INVENTOR(S) : Robert S. Soloff et al.

Page 1 of 1

It is certified that error appears in the above-identified patent and that said Letters Patent is hereby corrected as shown below:

<u>Title page,</u>
Inventors: should read -- Robert S. Soloff, Ridgefield;
                    Floyd H. Dibble, Danbury, both of Conn.

Signed and Sealed this

Twenty-third Day of October, 2001

Attest:

*Nicholas P. Godici*

Attesting Officer

NICHOLAS P. GODICI
*Acting Director of the United States Patent and Trademark Office*